(12) United States Patent
Hagihara

(10) Patent No.: US 6,770,861 B2
(45) Date of Patent: Aug. 3, 2004

(54) IMAGE-SENSING DEVICE

(75) Inventor: Yoshio Hagihara, Amagasaki (JP)

(73) Assignee: Minolta Co., Ltd., Osaka (JP)

( * ) Notice: Subject to any disclaimer, the term of this patent is extended or adjusted under 35 U.S.C. 154(b) by 30 days.

(21) Appl. No.: 09/782,706

(22) Filed: Feb. 13, 2001

(65) Prior Publication Data
US 2001/0020672 A1 Sep. 13, 2001

(30) Foreign Application Priority Data

Mar. 8, 2000 (JP) .......................... 2000-068591
Jun. 22, 2000 (JP) .......................... 2000-187128

(51) Int. Cl.$^7$ ............................ H01L 27/00; H04N 9/73
(52) U.S. Cl. .................. 250/208.1; 250/214.1; 250/214 C; 348/223.1; 348/244
(58) Field of Search ............... 250/208.1, 214.1, 250/214 C; 348/223.1, 244

(56) References Cited

U.S. PATENT DOCUMENTS

| | | | | |
|---|---|---|---|---|
| 4,703,442 A | * | 10/1987 | Levine | 348/244 |
| 4,910,598 A | * | 3/1990 | Itakura et al. | 348/244 |
| 4,945,418 A | * | 7/1990 | Mutoh | 348/308 |
| 4,973,833 A | | 11/1990 | Takada et al. | 250/208.1 |
| 5,241,575 A | | 8/1993 | Miyatake et al. | 377/60 |
| 5,335,072 A | * | 8/1994 | Tanaka et al. | 348/232 |
| 5,508,740 A | * | 4/1996 | Miyaguchi et al. | 348/244 |
| 5,583,397 A | * | 12/1996 | Ogawa | 315/151 |
| 5,861,913 A | * | 1/1999 | Tanaka | 348/164 |
| 6,075,562 A | * | 6/2000 | Sakaguchi et al. | 348/223 |
| 6,191,408 B1 | * | 2/2001 | Shinotsuka et al. | 250/208.1 |
| 6,552,332 B2 | * | 4/2003 | Kusaka et al. | 250/238 |

FOREIGN PATENT DOCUMENTS

JP        3-192764 A     8/1991

* cited by examiner

Primary Examiner—David V. Bruce
Assistant Examiner—Allen C Ho
(74) Attorney, Agent, or Firm—Sidley Austin Brown & Wood LLP

(57) ABSTRACT

In an image-sensing device, a temperature-corrected image signal obtained from a sensor 1 is converted into a digital signal by an A/D converter circuit 2. The image signal thus converted into a digital signal is separated into three color signals, i.e. R, G, and B signals, by an RGB selection circuit 3. An initial state setting circuit 4 adds offset voltages to the R, G, and B signals individually to adjust the white balance for initialization. In actual image sensing, on the basis of the thus initialized R, G, and B signals, a color temperature detection circuit 5 detects the color temperature of the subject, and, on the basis of the detected color temperature, a white balance adjustment circuit 6 adds offset voltages to the R and B signals to adjust the white balance.

10 Claims, 10 Drawing Sheets

IMAGE-SENSING DEVICE

This application is based on Japanese Patent Applications Nos. 2000-068591 and 2000-187128 filed respectively on Mar. 8, 2000 and Jun. 22, 2000, the contents of which are hereby incorporated by reference.

BACKGROUND OF THE INVENTION

1. Field of the Invention

The present invention relates to an image-sensing device incorporating a solid-state image sensor that outputs an electric signal natural-logarithmically proportional to the amount of incident light, and particularly to an image-sensing device that achieves adjustment of white balance by processing the electric signal output from a solid-state image sensor.

2. Description of the Prior Art

The assignee of the present invention once proposed a solid-state image sensor that outputs an electric signal natural-logarithmically proportional to the amount of incident light and that thus offers a wide dynamic range (see U.S. Pat. No. 4,973,833). This solid-state image sensor is provided with a photosensitive means that produces a photocurrent proportional to the amount of incident light, a MOS transistor to which the photocurrent is fed, and a bias means that biases the MOS transistor in such a way that a subthreshold current flows through the MOS transistor. The configuration of the photoelectric conversion circuit formed within each pixel provided in such a solid-state image sensor is shown in FIG. 16.

As shown in FIG. 16, each pixel has a photoelectric conversion circuit composed of a PN-junction photodiode PD that functions as a photosensitive means and a MOS transistor T100 that has its drain and gate connected to the anode of the photodiode PD. A direct-current voltage VPD is applied to the cathode of the photodiode PD and a direct-current voltage VPS is applied to the MOS transistor T100 so that the MOS transistor T100 is so biased as to operate in a subthreshold region.

This photoelectric conversion circuit, composed of a photodiode PD and a MOS transistor T100 as described above, outputs the gate voltage of the MOS transistor T100 as an electric signal logarithmically proportional to the amount of light incident on the photodiode PD. This electric signal, obtained as the gate voltage of the MOS transistor T100, is then amplified by an amplifier circuit provided as the stage succeeding the photoelectric conversion circuit within each pixel, and is then fed out from the pixel. This output signal from each pixel is logarithmically proportional to the amount of incident light, and thus offers the advantage of covering a wide dynamic range.

Here, the electric signal output from the photoelectric conversion circuit shown in FIG. 16 (i.e. the gate voltage of the MOS transistor T100) is given by $$Vg = VPS + Vt + (nkT/q) \cdot \ln(Ip/Id) \quad (1)$$

where Vg represents the gate voltage of the MOS transistor T100; Vt represents the threshold voltage of the MOS transistor T100; n represents a constant determined by the gate insulating film capacitance and the depletion layer capacitance; k represents the Boltzmann constant; q represents the amount of electric charge carried by an electron; Ip represents the photocurrent flowing out of the photodiode PD; Id represents the drain current of the MOS transistor T100; and T represents the absolute temperature.

As will be clear from equation (1) above, the electric signal output from the photoelectric conversion circuit is influenced by temperature. Therefore, if this electric signal is simply amplified with an amplifier circuit to produce an output signal that is fed out intact as an image signal, quite inconveniently, the level of the thus obtained image signal varies with the ambient temperature around the image-sensing device.

Moreover, when image sensing is performed with an image-sensing device incorporating such a solid-state image sensor, the electric signal output from the image-sensing device includes a temperature-dependent component, and is thus influenced by the ambient temperature inside the image-sensing device. On the other hand, as the color temperature of a subject to be sensed varies, the wavelength spectrum of the subject varies, and therefore the levels of the color signals, i.e. the R (red), G (green), and B (blue) signals, obtained through an RGB filter vary according to the environment in which the subject is situated. For these reasons, even if a white subject, which is supposed to yield maximum levels in all the R, G, and B signals, is sensed, the image reproduced from the R, G, and B signals obtained as a result of the image sensing does not always appear quite white.

SUMMARY OF THE INVENTION

An object of the present invention is to provide an image-sensing device that outputs an electric signal logarithmically proportional to the amount of incident light and that achieves adjustment of white balance by detecting the levels of individual color signals, comparing them with one another, and varying the level of the individual color signals according to the comparison results.

Another object of the present invention is to provide an image-sensing device that can suppress temperature-dependent variation of the output signal thereof.

To achieve the above objects, according to one aspect of the present invention, an image-sensing device is provided with: a photoelectric conversion portion that outputs an electric signal natural-logarithmically proportional to the amount of incident light; and an output circuit that includes a temperature sensor and that corrects the electric signal output from the photoelectric converter on the basis of ambient temperature detected by the temperature sensor.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
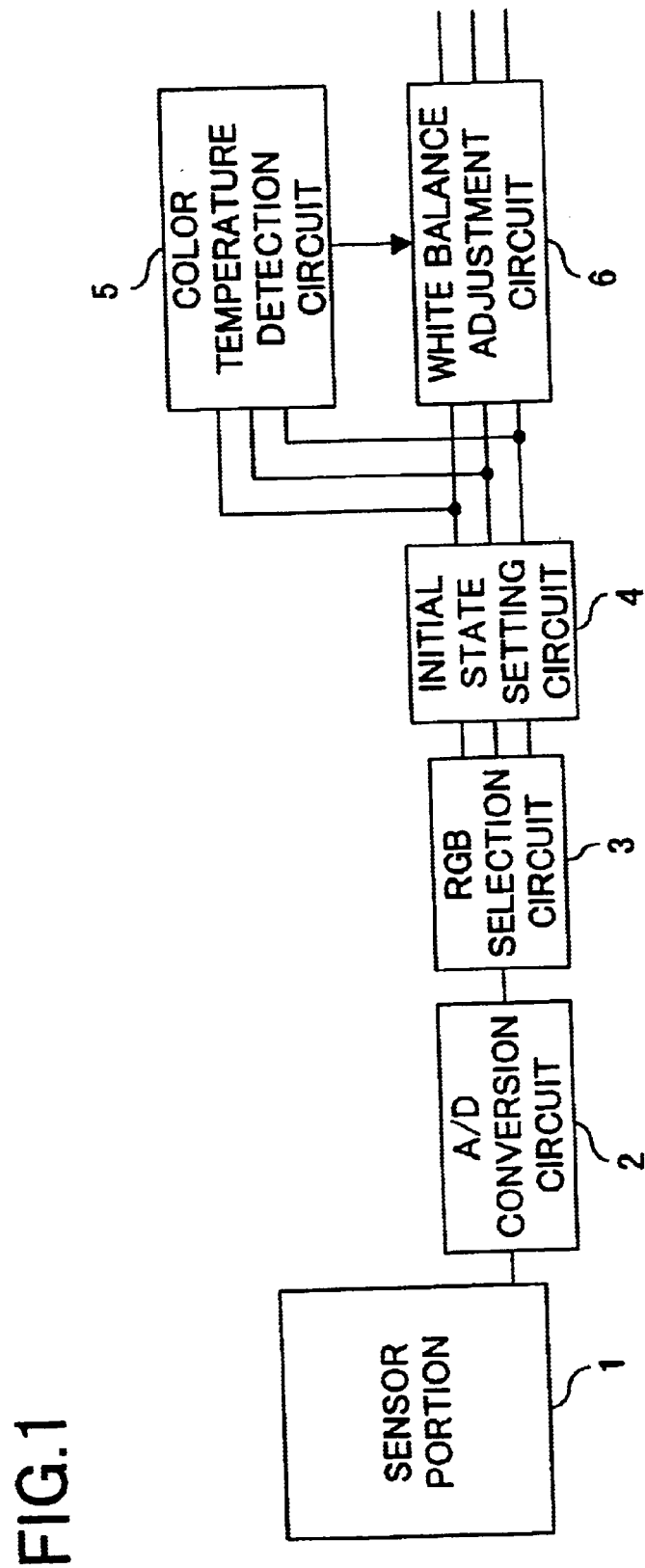
FIG. 1 is a block diagram showing the internal configuration of an image-sensing device embodying the invention.
Figure 2:
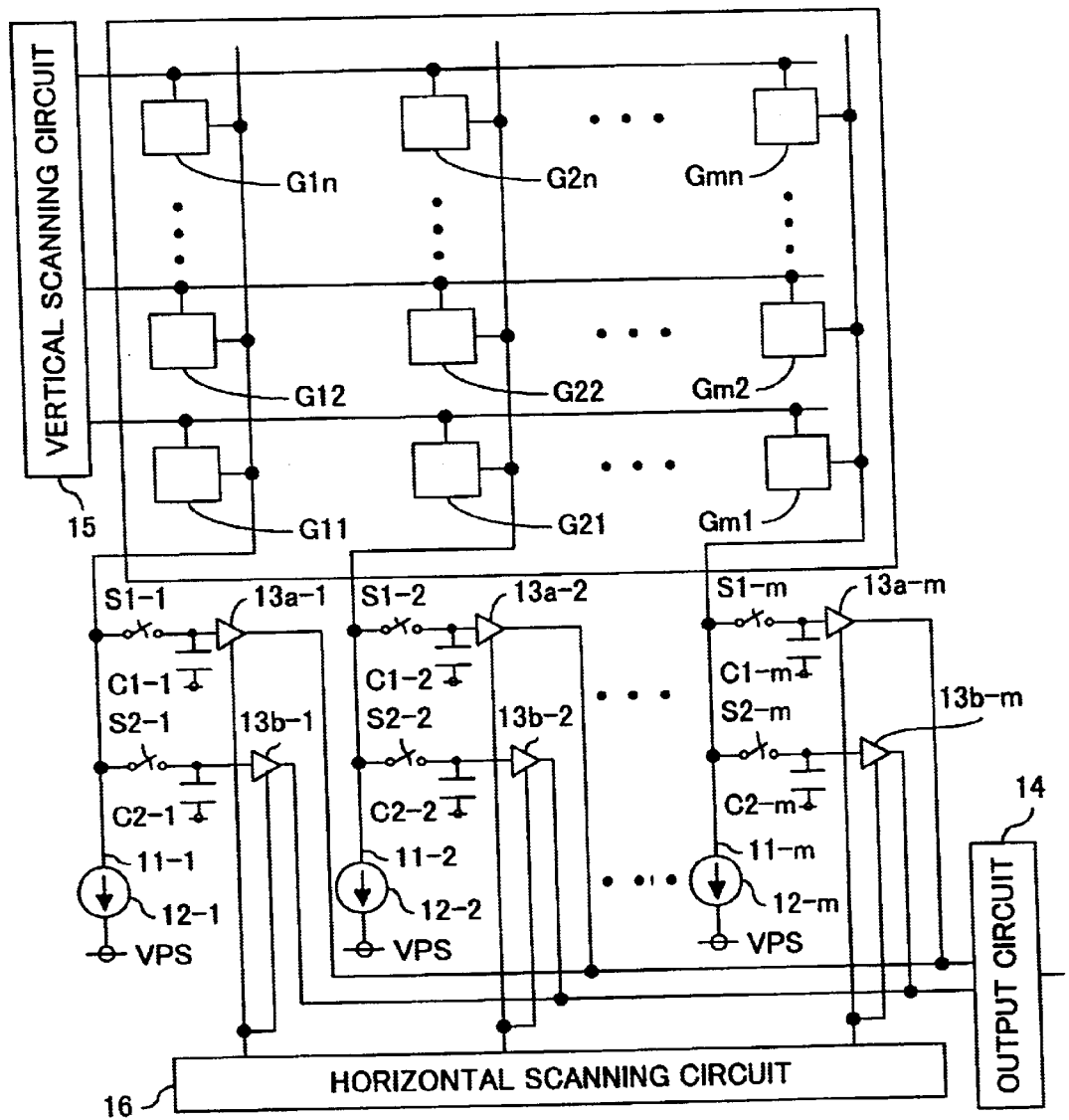
FIG. 2 is a block diagram showing the internal configuration of the sensor portion of the image-sensing device shown in FIG. 1.
Figure 3:
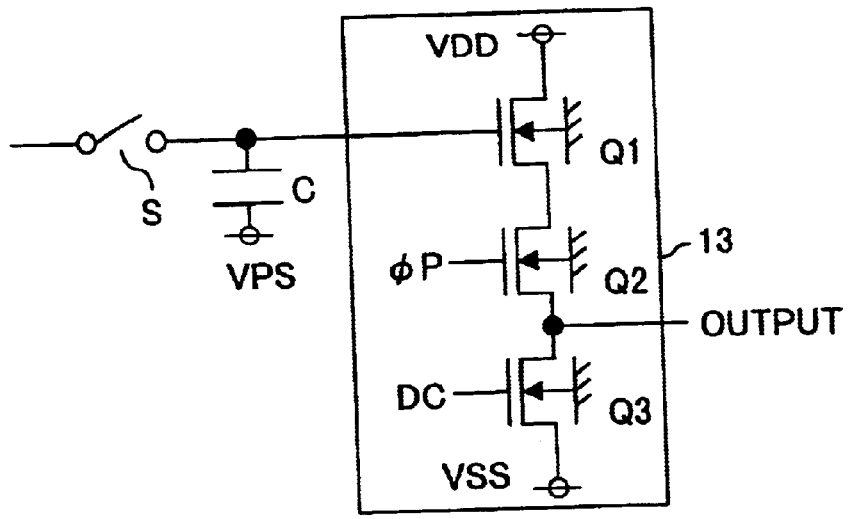
FIG. 3 is a circuit diagram showing the internal configuration of each buffer provided in the sensor portion shown in FIG. 2.

Embodiments of the present invention will be described with reference to the drawings. FIG. 1 is a block diagram showing the internal configuration of an image-sensing device embodying the invention. FIG. 2 is a block diagram showing the internal configuration of the sensor portion of the image-sensing device shown in FIG. 1. FIG. 3 is a circuit diagram showing the internal configuration of each buffer provided in the sensor portion shown in FIG. 2.

The image-sensing device shown in FIG. 1 includes the following: a sensor portion 1 that outputs an electric signal logarithmically proportional to the amount of incident light; an analog-to-digital (A/D) conversion circuit 2 that converts the electric signal fed from the sensor portion 1 into a digital signal; an RGB selection circuit 3 that separates the digital signal fed from the A/D conversion circuit 2 into an R signal, a G signal, and a B signal; an initial state setting circuit 4 that adds offset voltages to the R, G, and B signals fed from the RGB selection circuit 3 to adjust white balance and thereby initialize the R, G, and B signals; a color temperature detection circuit 5 that detects the color temperature of the subject sensed by the sensor portion 1 on the basis of the R, G, and B signals fed from the initial state setting circuit 4; and a white balance adjustment circuit 6 that adds offset voltages to the R, G, and B signals fed from the initial state setting circuit 4 on the basis of the color temperature detected by the color temperature detection circuit 5.

(1) Configuration of the Sensor Portion

First, the configuration of the sensor portion 1 of the image-sensing device configured as described above will be described. As shown in FIG. 2, the sensor portion 1 includes the following: pixels G11 to Gmn each having a photosensor such as a photodiode; signal lines 11-1 to 11-m connected, column by column, to the output-side ends of the pixels G11 to Gmn; constant-current sources 12-1 to 12-m connected to the signal lines 11-1 to 11-m, respectively; a vertical scanning circuit 15 that feeds a pulse signal $\phi V$ (described later) to the pixels G11 to Gmn so that the pixels G11 to Gmn output their output signals to the signal lines 11-1 to 11-m row by row; and a horizontal scanning circuit 16 that feeds a pulse signal $\phi P$ (described later) to buffers 13a-1 to 13a-m and 13b-1 to 13b-m so that the output signals from the pixels G11 to Gmn are fed to an output circuit 14 from one pixel after another. That is, the output signal from the pixel Gab (where "a" represents a natural number fulfilling $1 \leq a \leq m$ and "b" represents a natural number fulfilling $1 \leq b \leq n$) is fed out by way of the signal line 11-a and is amplified by the constant-current source 12-a connected to that signal line 11-a.

To the signal lines 11-1 to 11-m are connected, respectively, switches S1-1 to S1-m and switches S2-1 to S2-m. Through the switches S1-1 to S1-m, image signals are fed from the signal lines 11-1 to 11-m to capacitors C1-1 to C1-m, respectively. On the other hand, through the switches S2-1 to S2-m, noise signals are fed from the signal lines 11-1 to 11-m to capacitors C2-1 to C2-m, respectively. The image signals fed to the capacitors C1-1 to C1-m and sampled and held therein are then fed through the buffers 13a-1 to 13a-m, respectively, to the output circuit 14. On the other hand, the noise signals fed to the capacitors C2-1 to C2-m and sampled and held therein are then fed through the buffers 13b-1 to 13b-m, respectively, to the output circuit 14.

In this sensor portion 1 configured as described above, although not shown, color filters of three primary colors, i.e. red, green, and blue, are provided in the photoelectric conversion portions of the individual pixels G11 to Gmn, so that a pixel provided with a red, green, or blue color filter outputs an R, G, or B signal, respectively. Generally, the pixels are arranged in groups each consisting of four pixels, i.e. one with a red color filter, one with a blue color filter, and two with a green color filter. In the embodiment under discussion, however, it is assumed that the pixels are arranged in groups each consisting of three pixels each provided with a different color filter.

(1—1) Configuration of the Buffer

As shown in FIG. 3, the buffers 13a-1 to 13a-m and 13b-1 to 13b-m are each composed of MOS transistors. Specifically, the buffer 13 (corresponding to the buffers 13a-1 to 13a-m and 13b-1 to 13b-m shown in FIG. 2) is composed of an N-channel MOS transistor Q1 having its gate connected to the node between the switch S (corresponding to the switches S1-1 to S1-m and S2-1 to S2-m shown in FIG. 2) and the capacitor C (corresponding to the capacitors C1-1 to C1-m and C2-1 to C2-m shown in FIG. 2), an N-channel MOS transistor Q2 having its drain connected to the source of the MOS transistor Q1, and an N-channel MOS transistor Q3 having its drain connected to the source of the MOS transistor Q2.

A direct-current voltage VDD is applied to the drain of the MOS transistor Q1. A pulse signal $\phi P$ is fed to the gate of the MOS transistor Q2 so that the MOS transistor Q2 functions as a switch. A direct-current voltage is applied to the gate of the MOS transistor Q3 and a direct-current voltage VSS is applied to the source of the same MOS transistor Q3 so that the MOS transistor Q3 functions as a constant-current source. The buffer 13 yields its output at the node between the source of the MOS transistor Q2 and the drain of the MOS transistor Q3.

(1–2a) First Example of the Configuration of the Output Circuit

Figure 4:
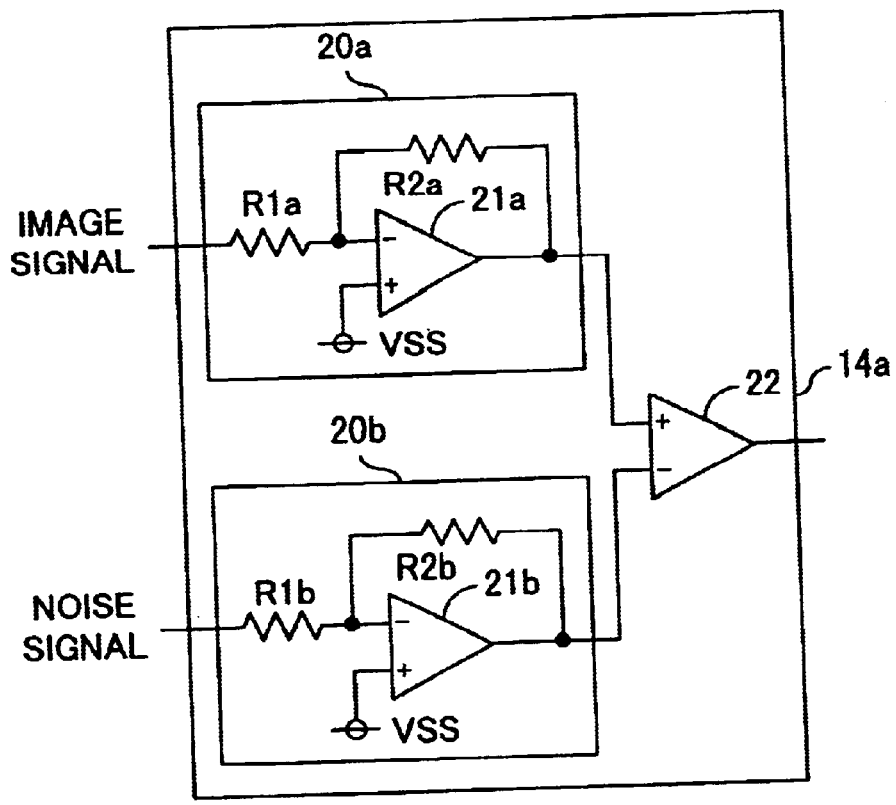
FIG. 4 is a block diagram showing an example of the internal configuration of the output circuit provided in the sensor portion shown in FIG. 2.

FIG. 4 shows an example of the configuration of the output circuit provided in the sensor portion 1 configured as shown in FIG. 2.

The output circuit 14a shown in FIG. 4 (corresponding to the output circuit 14 shown in FIG. 2) includes the following: an inverting amplifier 20a composed of a resistor R1a having one end connected to the output terminals of the buffers 13a-1 to 13a-m (FIG. 2) so as to receive image signals, a resistor R2a connected to the other end of the resistor R1a, and a differential amplifier circuit 21a having its inverting input terminal connected to the node between the resistors R1a and R2a and receiving at its non-inverting input terminal the direct-current voltage VSS; an inverting amplifier 20b composed of a resistor R1b having one end connected to the output terminals of the buffers 13b-1 to 13b-m (FIG. 2) so as to receive noise signals, a resistor R2b connected to the other end of the resistor R1b, and a differential amplifier circuit 21b having its inverting input terminal connected to the node between the resistors R1b and R2b and receiving at its non-inverting input terminal the direct-current voltage VSS; and a differential amplifier circuit 22 having its non-inverting input terminal connected to the output terminal of the differential amplifier circuit 21a and having its inverting input terminal connected to the output terminal of the differential amplifier circuit 21b. The resistors R2a and R2b are, at the other end, connected to the output terminals of the differential amplifier circuits 21a and 21b, respectively. The resistors R1a and R1b have a resistance r1 and the resistors R2a and R2b have a resistance r2.

Configured as described above, the output circuit 14a, using the inverting amplifier 20a, inverts and amplifies the image signals that are fed thereto sequentially from the buffers 13a-1 to 13a-m and, using the inverting amplifier 20b, inverts and amplifies the noise signals that are fed thereto sequentially from the buffers 13b-1 to 13b-m. Here, since the resistors R1a and R1b have a resistance r1 and the resistors R2a and R2b have a resistance r2, the gain of the inverting amplifiers 20a and 20b is (−r2/r1). Therefore, by using temperature-sensitive resistors such as thermistors as, for example, the resistors R1a and R1b, it is possible to make the gain of the inverting amplifiers 20a and 20b inversely proportional to temperature T. That is, by using temperature-sensitive resistors at least as the resistors R1a and R1b or as the resistors R2a and R2b, it is possible to make the gain of the inverting amplifiers 20a and 20b fulfill (A/T) (where A represents a constant, and T represents the absolute temperature).

Here, on the basis of equation (1) noted earlier, the levels of the image signal and the noise signal fed to the inverting amplifiers 20a and 20b, respectively, are given by equations (2) and (3) below.

$$V1 = K \cdot [VPS + Vt + (nkT/q) \cdot ln(Ip1/Id)] \quad (2)$$

$$V2 = K \cdot [VPS + Vt + (nkT/q) \cdot ln(Ip2/Id)] \quad (3)$$

where V1 represents the signal level of the image signal; V2 represents the signal level of the noise signal; Vt represents the threshold voltage of the MOS transistor T1; n represents a constant determined by the gate insulating film capacitance and the depletion layer capacitance; k represents the Boltzmann constant; q represents the amount of electric charge carried by an electron; Ip1 and Ip2 represents the photocurrent flowing out of the photodiode PD; Id represents the drain current of the MOS transistor T1; and K represents a constant.

Thus, the image signal, of which the level is given by equation (2), is converted by the inverting amplifier 20a so as to have a level V3 given by equation (4) below, and the noise signal, of which the level is given by equation (3), is converted by the inverting amplifier 20b so as to have a level V4 given by equation (5) below.

$$V3 = K \cdot A \cdot [VPS + Vt + (nkT/q) \cdot ln(Ip1/Id)]/T \quad (4)$$

$$V4 = K \cdot A \cdot [VPS + Vt + (nkT/q) \cdot ln(Ip2/Id)]/T \quad (5)$$

The image and noise signals thus converted by the inverting amplifiers 20a and 20b are then fed to the differential amplifier circuit 22 so that the noise signal is subtracted from the image signal. As a result, the differential amplifier circuit 22 outputs an image signal from which noise components resulting from variations in sensitivity among the individual pixels have been removed. The level of this image signal is given by equation (6) below.

$$V5 = K \cdot A \cdot (nk/q) ln(Ip1/Ip2) \quad (6)$$

As will be clear from this formula (6), the level of the signal output from the differential amplifier circuit 22 contains no temperature-dependent component, and thus the output signal 14a outputs a temperature-corrected signal.

(1–2b) Second Example of the Configuration of the Output Circuit

Figure 5:
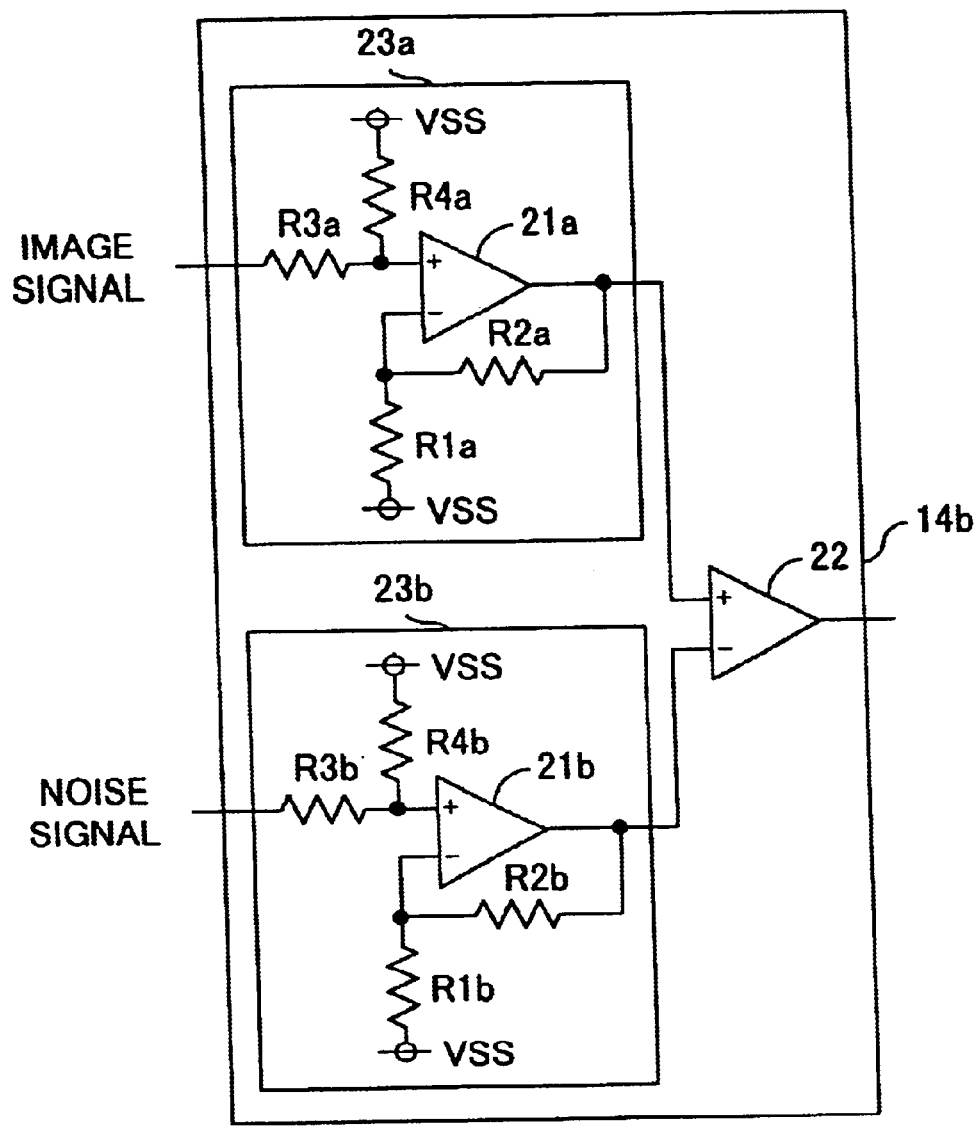
FIG. 5 is a block diagram showing another example of the internal configuration of the output circuit provided in the sensor portion shown in FIG. 2.

FIG. 5 shows another example of the configuration of the output circuit provided in the sensor portion 1 configured as shown in FIG. 2. Here, such circuit elements, signal lines, and others as serve the same purposes as in the output circuit shown in FIG. 4 are identified with the same reference symbols, and their detailed descriptions will not be repeated.

The output circuit 14b shown in FIG. 5 is composed of the following: a differential amplifier 23a built by providing the inverting amplifier 20a (FIG. 4) additionally with resistors R3a and R4a that have one end connected to the non-inverting input terminal of the differential amplifier circuit 21a; a differential amplifier 23b built by providing the inverting amplifier 20b (FIG. 4) additionally with resistors R3b and R4b that have one end connected to the non-inverting input terminal of the differential amplifier circuit 21b; and a differential amplifier circuit 22.

In this output circuit 14b, the resistors R1a and R1b both receive, at one end, the direct-current voltage VSS instead of respectively receiving image and noise signals. The resistor R3a has the other end connected to the output terminals of the buffers 13a-1 to 13a-m (FIG. 2) to receive image signals, and the resistor R3b has the other end connected to the output terminals of the buffers 13b-1 to 13b-m (FIG. 2) to receive noise signals. The resistors R4a and R4b receive, at the other end, the direct-current voltage VSS. The resistors R1a, R1b, R3a, and R3b have a resistance r1, and the resistors R2a, R2b, R4a, and R4b have a resistance r2.

In this output circuit 14b configured as described above, the gain of the differential amplifiers 23a and 23b is (r2/r1). By using temperature-sensitive resistors such as thermistors as, for example, the resistors R1a, R1b, R3a, and R3b, it is possible to make the gain of the differential amplifiers 23a and 23b inversely proportional to temperature T. That is, by using temperature-sensitive resistors at least as the resistors R1a, R1b, R3a, and R3b or as the resistors R2a, R2b, R4a, and R4b, it is possible to make the gain of the differential amplifiers 23a and 23b fulfill (B/T) (where B represents a constant, and T represents the absolute temperature). As a result, as in the output circuit 14a (FIG. 4), the image and noise signals are multiplied by the gain (B/T) by the differential amplifiers 23a and 23b and are then fed to the differential amplifier circuit 22, which thus outputs a signal that has been corrected for temperature-dependent variations and for variations in sensitivity among the individual pixels.

(1–2c) Third Example of the Configuration of the Output Circuit

Figure 6:
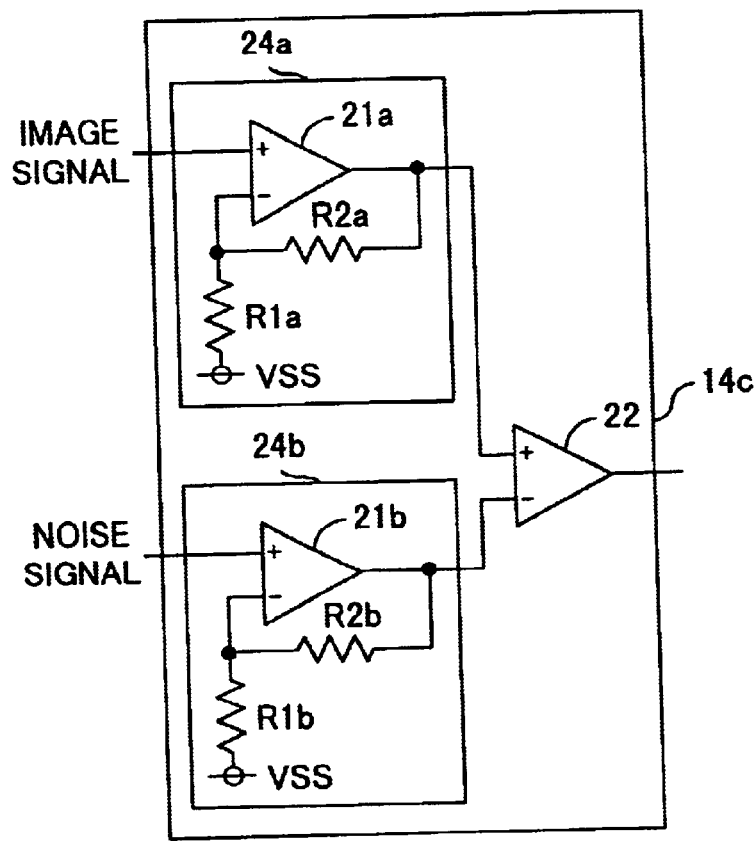
FIG. 6 is a block diagram showing another example of the internal configuration of the output circuit provided in the sensor portion shown in FIG. 2.

FIG. 6 shows another example of the configuration of the output circuit provided in the sensor portion 1 configured as shown in FIG. 2. Here, such circuit elements, signal lines, and others as serve the same purposes as in the output circuit shown in FIG. 5 are identified with the same reference symbols, and their detailed descriptions will not be repeated.

The output circuit 14c shown in FIG. 6 is composed of the following: a non-inverting amplifier 24a built by removing the resistors R3a and R4a from the differential amplifier 23a (FIG. 5); a non-inverting amplifier 24b built by removing the resistors R3b and R4b from the differential amplifier 23b (FIG. 5); and a differential amplifier circuit 22. Moreover, in the non-inverting amplifier 24a, the differential amplifier circuit 21a has its non-inverting input terminal connected to the output terminals of the buffers 13a-1 to 13a-m (FIG. 2) so as to receive image signals, and, in the non-inverting amplifier 24b, the differential amplifier circuit 21b has its non-inverting input terminal connected to the output terminals of the buffers 13b-i to 13b-m (FIG. 2) so as to receive noise signals. The resistors R1a and R1b have a resistance r1, and the resistors R2a and R2b have a resistance r2.

In this output circuit 14c configured as described above, the gain of the non-inverting amplifiers 24a and 24b is (1+r2/r1). By using temperature-sensitive resistors such as thermistors as, for example, the resistors R1a and R1b, it is possible to make the gain of the non-inverting amplifiers 24a and 24b inversely proportional to temperature T. That is, by using temperature-sensitive resistors at least as the resistors R1a and R1b or as the resistors R2a and R2b, it is possible to make the gain of the non-inverting amplifiers 24a and 24b fulfill (C/T) (where C represents a constant, and T represents the absolute temperature). As a result, as in the output circuit 14b (FIG. 5), the image and noise signals are multiplied by the gain (C/T) by the non-inverting amplifiers 24a and 24b and are then fed to the differential amplifier circuit 22, which thus outputs a signal that has been corrected for temperature-dependent variations and for variations in sensitivity among the individual pixels.

Moreover, feeding the image and noise signals to the non-inverting input terminals of the differential amplifier circuits in this way helps prevent unstable operation such as oscillation, and in addition helps obtain better frequency response and thus a more stable output than when those signals are fed to the inverting input terminals of the differential amplifier circuits.

(1–2d) Fourth Example of the Configuration of the Output Circuit

Figure 7:
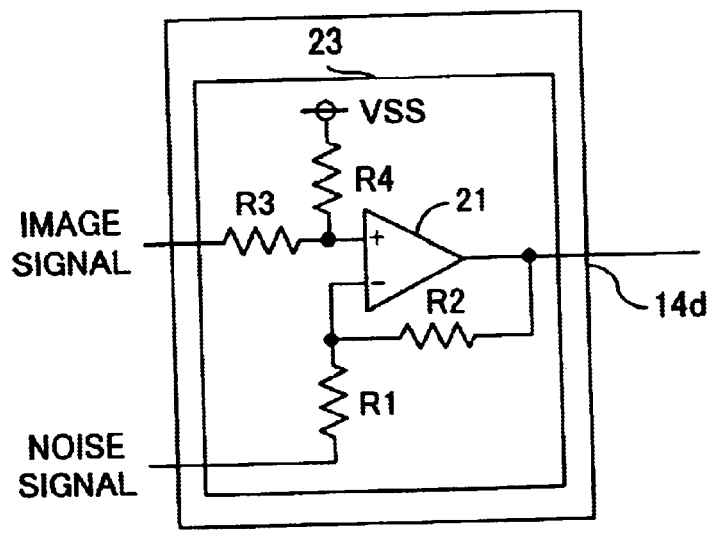
FIG. 7 is a block diagram showing another example of the internal configuration of the output circuit provided in the sensor portion shown in FIG. 2.

FIG. 7 shows another example of the configuration of the output circuit provided in the sensor portion 1 configured as shown in FIG. 2. Here, such circuit elements, signal lines, and others as serve the same purposes as in the output circuit shown in FIG. 5 are identified with the same reference symbols, and their detailed descriptions will not be repeated.

The output circuit 14d shown in FIG. 7 is built as a differential amplifier circuit 23 that is, on one hand, connected to the output terminals of the buffers 13a-1 to 13a-m (FIG. 2) so as to receive image signals and, on the other hand, connected to the output terminals of the buffers 13b-1 to 13b-m (FIG. 2) so as to receive noise signals. The noise signal is fed to one end of a resistor R1, and the image signal is fed to one end of a resistor R3. The differential amplifier circuit 23 is composed of resistors R1, R2, R3, and R4 and a differential amplifier circuit 21, which respectively correspond to the resistors R1a, R2a, R3a, and R4a and a differential amplifier circuit 21a that constitute the differential amplifier 23a in the output circuit 14b (FIG. 5).

In this output circuit 14d configured as described above, when image and noise signals are fed thereto, the noise signal is subtracted from the image signal, and the resulting signal is then multiplied by the gain (r2/r1) of the differential amplifier 23 and is then fed out. Here, as in the output circuit 14b, by using temperature-sensitive resistors such as thermistors as, for example, the resistors R1 and R3, it is possible to make the gain of the differential amplifier 23 inversely proportional to temperature T. That is, by using temperature-sensitive resistors at least as the resistors R1 and R3 or as the resistors R2 and R4, it is possible to make the gain of the differential amplifier 23 fulfill (B/T) (where B represents a constant, and T represents the absolute temperature). As a result, it is possible to obtain a signal that is corrected for temperature-related variations by being multiplied by the gain (B/T) by the differential amplifier 23 and that is corrected also for variations in sensitivity among the individual pixels.

By configuring the output circuit in such a way that both image and noise signals are fed to a single differential amplifier as described just above, it is possible to achieve, with that single differential amplifier, correction of both temperature-dependent variations and pixel sensitivity variations. Using a single differential amplifier in this way permits the output circuit of this example to have a simpler configuration than the output circuits 14a to 14c (FIGS. 4 to 6), and thus helps reduce the circuit scale of the sensor portion 1.

(1–3a) First Example of the Configuration of Each Pixel

Figure 8:
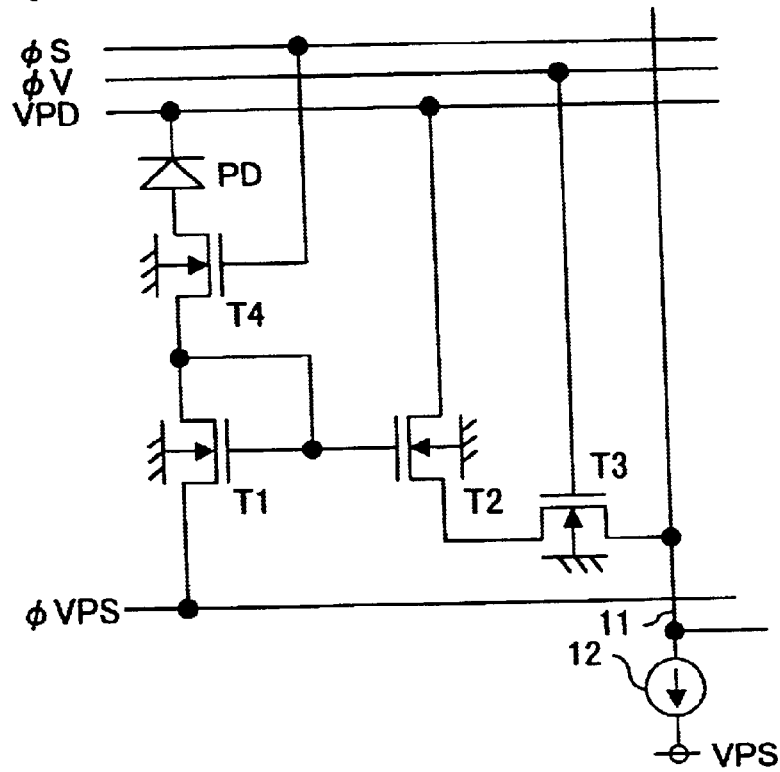
FIG. 8 is a circuit diagram showing an example of the configuration of each pixel provided in the sensor portion shown in FIG. 2.

FIG. 8 shows an example of the configuration of each pixel provided in the sensor portion 1 configured as shown in FIG. 2. In the pixel shown in FIG. 8, a photodiode PD receives at its cathode a direct-current voltage VPD, and has its anode connected to the drain of a MOS transistor T4. The source of this MOS transistor T4 is connected to the gate and drain of a MOS transistor T1 and to the gate of a MOS transistor T2. The source of the MOS transistor T2 is connected to the drain of a MOS transistor T3, and the drain of this MOS transistor T3 is connected to a signal line 11 (corresponding to the signal lines 11-1 to 11-m shown in FIG. 2). The MOS transistors T1 to T4 are all N-channel MOS transistors having their back gates grounded.

A signal φVPS is fed to the source of the MOS transistor T1, and a signal φV is fed to the gate of the MOS transistor T3. Moreover, a signal φS is fed to the gate of the MOS transistor T4, and a direct-current voltage VPD is applied to the drain of the MOS transistor T2. In this pixel configured as described above, a constant-current source 12 (corresponding to the constant-current sources 12-1 to 12-m shown in FIG. 2) receiving at one end a direct-current voltage VPS is connected by way of the MOS transistor T3 and the signal line 11 to the source of the MOS transistor T2. Accordingly, when the MOS transistor T3 is on, the MOS transistor T2 operates as a source-follower MOS transistor and serves to output a signal amplified by the constant-current source 12 to the signal line 11.

How this pixel configured as described above operates in an image-sensing operation and in a sensitivity variation detection operation will be described below. Here, the signal φVPS is a binary voltage signal that is either at a high level that permits the MOS transistor T1 to operate in a subthreshold region or at a low level that is lower than this high level and that permits a higher current to flow through the MOS transistor T1 than when the MOS transistor T1 is fed with a high level as the signal φVPS.

1. Image-Sensing Operation (for Outputting an Image Signal)

First, how the pixel shown in FIG. 8 operates when image sensing is performed will be described. Throughout an image-sensing operation, the signal φS is kept at a high level so that the MOS transistor T4 remains on. Moreover, the signal φVPS fed to the source of the MOS transistor T1 is kept at a high level so that the MOS transistor T1 operates in a subthreshold region. In this state, when light is incident on the photodiode PD, a photocurrent is generated therein, and, due to the subthreshold characteristics of a MOS transistor, a voltage natural-logarithmically proportional to the photocurrent appears at the gates of the MOS transistors T1 and T2.

Then, the pulse signal φV is fed to the MOS transistor T3 so that the MOS transistor T2, in proportion to its gate voltage, outputs its source current through the MOS transistor T3 to the signal line 11. Here, since the MOS transistor T2 operates as a source-follower MOS transistor, a voltage signal to be used as an image signal appears on the signal line 11. Thereafter, the signal φV is turned to a low level to turn the MOS transistor T3 off. The image signal thus output through the MOS transistors T2 and T3 is proportional to the gate voltage of the MOS transistor T2, and is thus logarithmically proportional to the amount of light incident on the photodiode PD.

2. Sensitivity Variation Detection Operation (for Outputting a Noise Signal)

Figure 9:
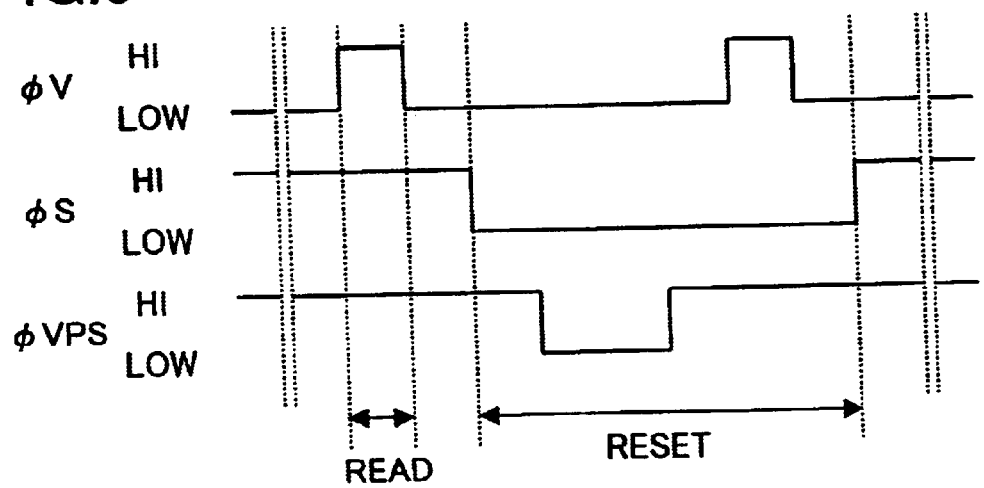
FIG. 9 is a timing chart showing the operation of the pixel shown in FIG. 8.

Next, how the pixel operates when the variation in sensitivity of the pixel is detected will be described with reference to the timing chart shown in FIG. 9. After, as described above, the pulse signal φV is fed in so that an image signal is fed out, first, the signal φS is turned to a low level to turn the MOS transistor T4 off and thereby start resetting. This causes negative electric charge to flow into the MOS transistor T1 through its source, and thus permits recombination therewith of the positive electric charge accumulated at the gate and drain of the MOS transistor T1 and at the gate of the MOS transistor T2. As a result, the potential at the gate and drain of the MOS transistor T1 falls to a certain level.

However, as the potential at the gate and drain of the MOS transistor T1 falls to a certain level, the resetting slows down. This slowing down is particularly remarkable when a thus far brightly-lit subject has suddenly become dimly-lit. To avoid this, next, the signal φVPS fed to the source of the MOS transistor T1 is turned to a low level. Lowering the source voltage of the MOS transistor T1 in this way causes the amount of negative electric charge that flows into the MOS transistor T1 through its source to increase, and thus prompts recombination therewith of the positive electric charge accumulated at the gate of the MOS transistor T2.

As a result, the potential at the gate and drain of the MOS transistor T1 falls further. Then, the signal φVPS fed to the source of the MOS transistor T1 is turned to a high level so that the MOS transistor T1 is brought back into its original potential state. After the MOS transistor T1 has been reset to its original potential state in this way, the pulse signal φV is fed to the gate of the MOS transistor T3 to turn this MOS transistor T3 on. This causes an output current representing the variation in sensitivity of each pixel resulting from variations in the characteristics of the MOS transistors T1 and T2 to be output to the signal line 11.

Here, since the MOS transistor T2 operates as a source-follower MOS transistor, a voltage signal to be used as a noise signal appears on the signal line 11. Thereafter, the signal φV is turned to a low level to turn the MOS transistor T3 off, and then the signal φS is turned to a high level to bring the MOS transistor T4 into a conducting state in preparation for the next image-sensing operation.

(1–3b) Second Example of the Configuration of Each Pixel

Figure 10:
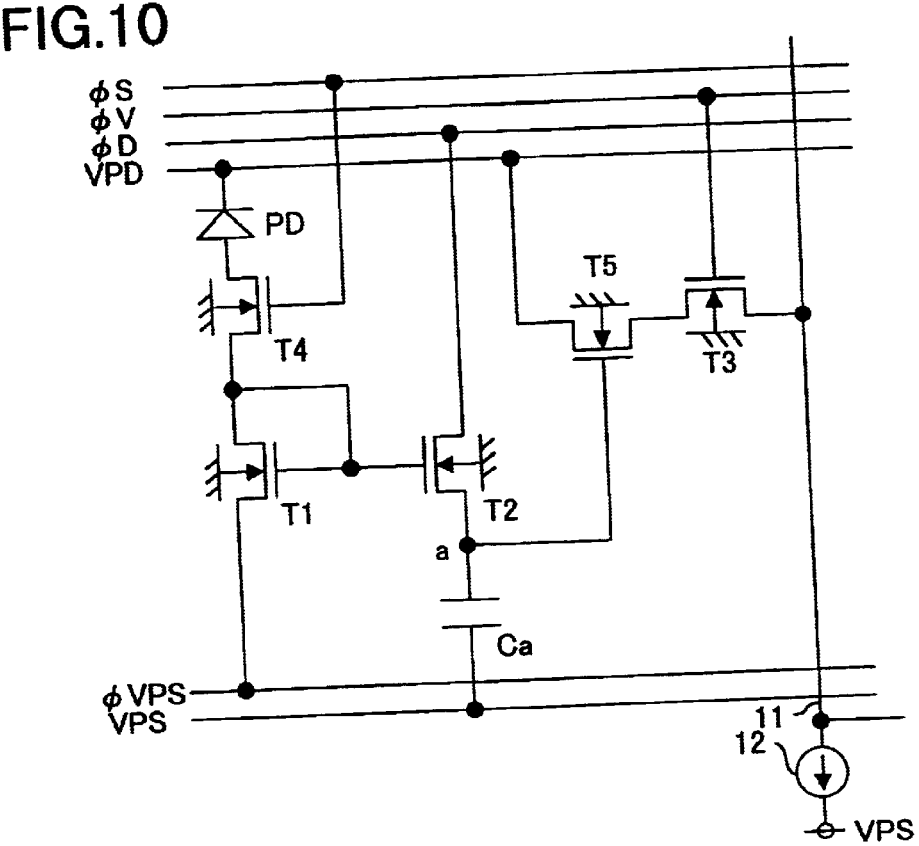
FIG. 10 is a circuit diagram showing another example of the configuration of each pixel provided in the sensor portion shown in FIG. 2.

FIG. 10 shows another example of the configuration of each pixel provided in the sensor portion 1 configured as shown in FIG. 2. Here, such circuit elements, signal lines, and others as serve the same purposes as in the pixel shown in FIG. 8 are identified with the same reference symbols, and their detailed descriptions will not be repeated.

The pixel shown in FIG. 10 is, as compared with the pixel shown in FIG. 8, additionally provided with a capacitor Ca that constitutes an integrator circuit and a MOS transistor T5 that constitutes an amplifier circuit for amplifying the output from the source of the MOS transistor T2. Specifically, the source of the MOS transistor T2 is connected to one end of the capacitor Ca that receives at the other end the direct-current voltage VPS, and also to the gate of the MOS transistor T5. The source of the MOS transistor T5 is connected to the drain of the MOS transistor T3. The direct-current voltage VPD is applied to the drain of the MOS transistor T5, and a signal φD is fed to the drain of the MOS transistor T2. The MOS transistor T5 is, like the MOS transistors T1 to T4, an N-channel MOS transistor having its back gate grounded.

How this pixel configured as described above operates in an image-sensing operation and in a sensitivity variation detection operation will be described below. Here, as in the pixel shown in FIG. 8, the signal φVPS is a binary voltage signal that is either at a high level that permits the MOS transistor T1 to operate in a subthreshold region or at a low level that is lower than this high level and that permits a higher current to flow through the MOS transistor T1 than when the MOS transistor T1 is fed with a high level as the signal φVPS.

1. Image-Sensing Operation (for Outputting an Image Signal)

First, how the pixel shown in FIG. 10 operates when image sensing is performed will be described. As in the pixel shown in FIG. 8, throughout an image-sensing operation, the signals φS and φVPS are kept at a high level. In addition, the signal φD is kept at a high level so as to be kept at a voltage equal or close to the direct-current voltage VPD. In this state, when light is incident on the photodiode PD, a photocurrent is generated therein, and, due to the subthreshold characteristics of a MOS transistor, a voltage natural-logarithmically proportional to the photocurrent appears at the gates of the MOS transistors T1 and T2.

The voltage appearing at the gate of the MOS transistor T2 causes a current to flow through the MOS transistor T2, and an amount of electric charge equivalent to the value obtained by natural-logarithmically converting the integral of the photocurrent is accumulated in the capacitor Ca. That is, a voltage natural-logarithmically proportional to the integral of the photocurrent appears at the gate of the MOS transistor T5. Then, the pulse signal φV is fed to the MOS transistor T3, so that the MOS transistor T5, in proportion to its gate voltage, outputs its source current through the MOS transistor T3 to the signal line 11. Thereafter, the signal φV is turned to a low level to turn the MOS transistor T3 off.

2. Sensitivity Variation Detection Operation (for Outputting a Noise Signal)

Figure 11:
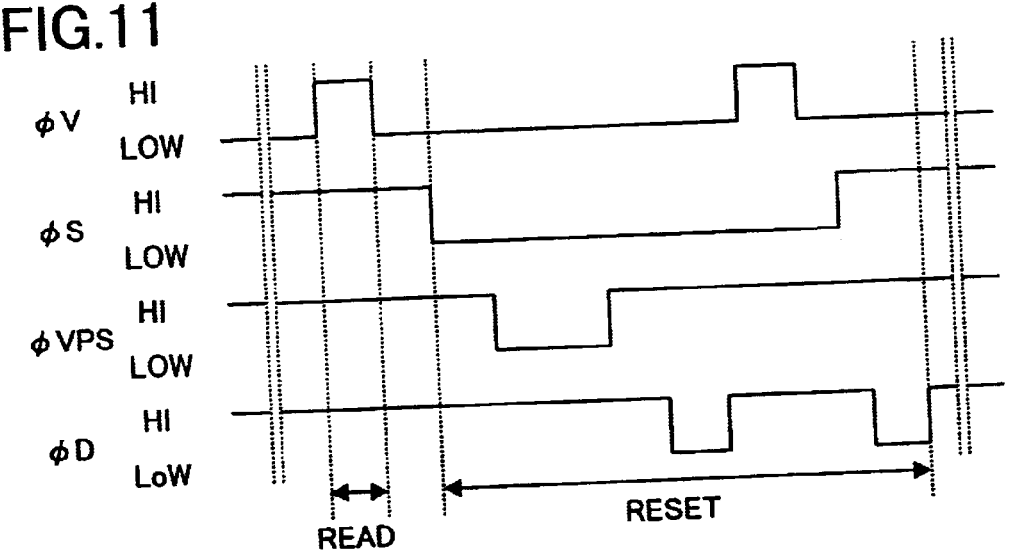
FIG. 11 is a timing chart showing the operation of the pixel shown in FIG. 10.

Next, how the pixel operates when the variation in sensitivity of the pixel is detected will be described with reference to the timing chart shown in FIG. 11. After, as described above, the pulse signal φV is fed in so that an image signal is fed out, first, as in the pixel shown in FIG. 8, the signal φS is turned to a low level to turn the MOS transistor T4 off and thereby start resetting. This causes negative electric charge to flow into the MOS transistor T1 through its source, and thus permits recombination therewith of the positive electric charge accumulated at the gate and drain of the MOS transistor T1 and at the gate of the MOS transistor T2. As a result, the potential at the gate and drain of the MOS transistor T1 falls to a certain level.

Next, the signal φVPS fed to the source of the MOS transistor T1 is turned to a low level so as to prompt recombination of the positive electric charge accumulated at the gate of the MOS transistor T2. Then, the signal φVPS fed to the source of the MOS transistor T1 is turned to a high level so that the MOS transistor T1 is brought back into its original potential state. After the MOS transistor T1 has been reset to its original potential state in this way, the signal φD is turned to a low level so that the electric charge accumulated in the capacitor Ca is discharged through the MOS transistor T2 to the signal line of the signal φD. This initializes the capacitor Ca and the potential at the gate of the MOS transistor T5. Then, the signal φD is turned back to a high level.

Then, the pulse signal φV is fed to the gate of the MOS transistor T3 to turn this MOS transistor T3 on. This causes a noise signal representing the variation in sensitivity of each pixel resulting from variations in the characteristics of the MOS transistors T1 and T2 to be output to the signal line 11. After this noise signal has been output, the signal φS is turned to a high level, and then the signal φD is turned back to a low level. This initializes the capacitor Ca and the potential at the gate of the MOS transistor T5. Then, the signal φD is turned back to a high level in preparation for the next image-sensing operation.

The pixel of this example may also be so configured as to have a direct-current voltage applied to the drain of the MOS transistor T2 and additionally include a transistor for resetting the capacitor Ca and the gate potential of the MOS transistor T5.

(1-4) Operation of the Sensor Portion

Figure 12:
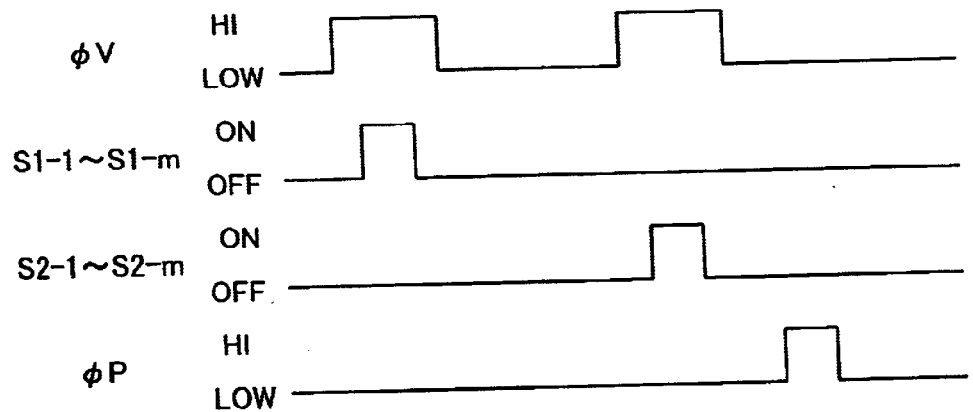
FIG. 12 is a timing chart showing the operation of the sensor portion shown in FIG. 2.

Now, how the sensor portion 1 configured as described above operates will be described with reference to the timing chart shown in FIG. 12. First, the vertical scanning circuit 15 feeds the pulse signal φV to the pixels G1k to Gmk (where "k" represents a natural number fulfilling 1≦k≦m) so that the pixels G1k to Gmk output image signals to the signal lines 11-1 to 11-m. Then, the switches S1-1 to S1-m are turned on so that the image signals output to the capacitors C1-1 to C1-m are sampled and held therein. At this point, the switches S2-1 to S2-m, and also the MOS transistors Q2 provided in the individual buffers 13a-1 to 13a-m and 13b-1 to 13b-m, are all off. After the image signals have been sampled and held in the capacitors C1-1 to C1-m in this way, the switches S1-1 to S1-m are turned off.

Next, the vertical scanning circuit 15 feeds the pulse signal φV again to the pixels G1k to Gmk so that the pixels G1k to Gmk output noise signals to the signal lines 11-1 to 11-m. Then, the switches S2-1 to S2-m are turned on so that the noise signals output to the capacitors C2-1 to C2-m are sampled and held therein. At this point, the switches S1-1 to S1-m, and also the MOS transistors Q2 provided in the buffers 13a-1 to 13a-m and 13b-1 to 13b-m, are all off. After the noise signals have been sampled and held in the capacitors C2-1 to C2-m in this way, the switches S2-1 to S2-m are turned off.

With the image signals from the pixels G1k to Gmk sampled and held in the capacitors C1-1 to C1-m and the noise signals from the pixels G1k to Gmk sampled and held in the capacitors C2-1 to C2-m, the horizontal scanning circuit 16 feeds the pulse signal φP to the gates of the MOS transistors Q2 provided in the buffers 13a-1 and 13b-1 to turn those MOS transistors Q2 on. As a result, the image and noise signals from the pixel G1k are fed to the output circuit 14, which then corrects the image signal with the noise signal and then outputs the image signal corrected for the noise component resulting from the variation in sensitivity of the pixel G1k. Then, the horizontal scanning circuit 16 feeds the pulse signal φP to the gates of the MOS transistors Q2 provided in the buffers 13a-2 and 13b-2 to turn those MOS transistors Q2 on, so that the output circuit 14 outputs the image signal corrected for the noise component resulting from the variation in sensitivity of the pixel G2k.

Then, in similar manners, the horizontal scanning circuit 16 feeds the pulse signal φP to the gates of the MOS transistors Q2 provided in the buffers 13a-3 to 13a-m and 13b-3 to 13b-m sequentially, so that the output circuit 14 outputs the image signals from the pixels G3k to Gmk sequentially after correcting them for the variations in sensitivity of those pixels on the basis of the noise signals therefrom. After the output circuit 14 completes outputting the sensitivity-variation-corrected image signals from the pixels G1k to Gmk sequentially, it goes on to output the sensitivity-variation-corrected image signals from the pixels G1(k+1) to Gm(k+1) sequentially in a similar manner.

(2) Configuration of the Other Portions Than the Sensor Portion

Figure 13:
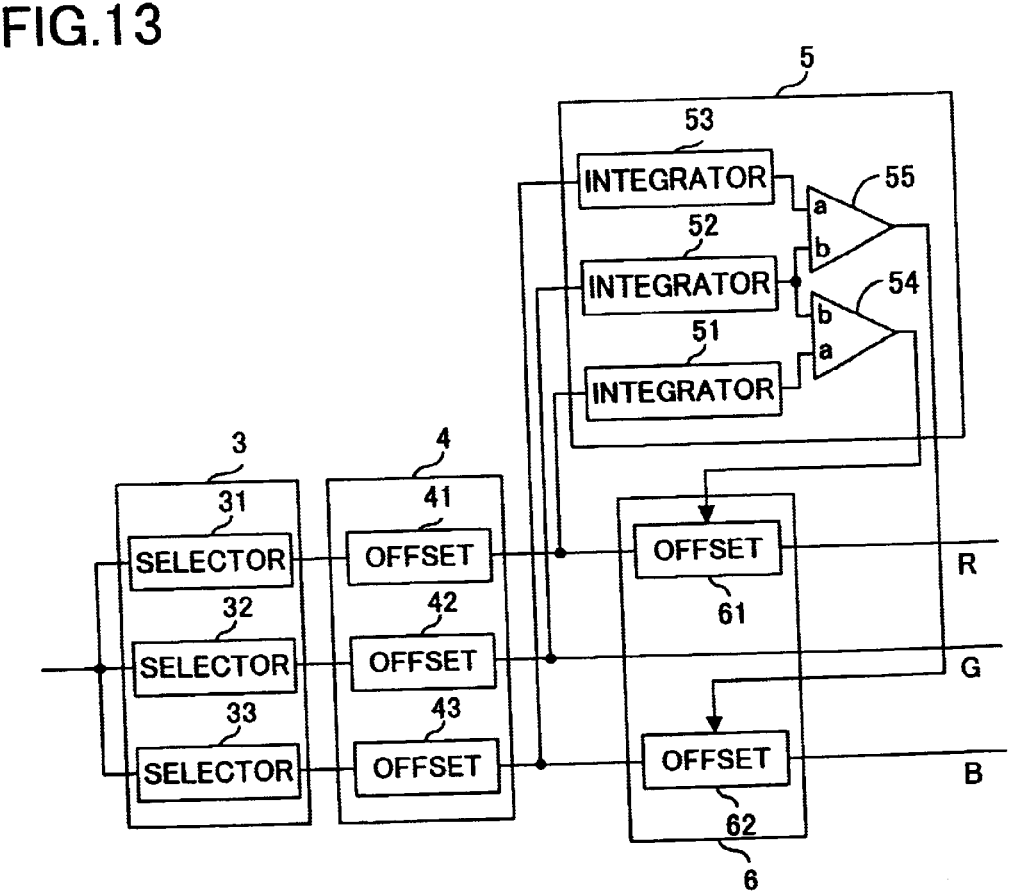
FIG. 13 is a block diagram showing the internal configuration of the RGB selection circuit, the initial state setting circuit, the color temperature detection circuit, and the white balance adjustment circuit provided in the image-sensing device shown in FIG. 1.

Next, the configuration of the RGB selection circuit 3, the initial state setting circuit 4, the color temperature detection circuit 5, and the white balance adjustment circuit 6 will be described with reference to FIG. 13. FIG. 13 is a block diagram showing the internal configuration of the RGB selection circuit 3, the initial state setting circuit 4, the color temperature detection circuit 5, and the white balance adjustment circuit 6.

As shown in FIG. 13, the RGB selection circuit 3 is composed of selectors 31, 32, and 33, the initial state setting circuit 4 is composed of offset adjustment circuits 41, 42, and 43, the color temperature detection circuit 5 is composed of integrator circuits 51, 52, and 53 and comparator circuits 54 and 55, and the white balance adjustment circuit 6 is composed of offset adjustment circuits 61 and 62. The RGB selection circuit 3, the initial state setting circuit 4, the color temperature detection circuit 5, and the white balance adjustment circuit 6, configured as described above, are interconnected as described below.

The selectors 31, 32, and 33 receive the image signal that has been converted into a digital signal by the A/D conversion circuit 2 and that includes an R, a G, and a B signal. The selectors 31, 32, and 33 also receive a clock that is synchronous with the R, G, and B signals fed from the A/D conversion circuit 2, and this clock enables the selectors 31, 32, and 33 to select and output respectively the R, G, and B signals. The R, G, and B signals thus separated by the selectors 31, 32, and 33 are fed individually to the initial state setting circuit 4.

In the initial state setting circuit 4, the offset adjustment circuits 41, 42, and 43 respectively receive the R, G, and B signals and adjust the offset voltages to be added individually to the R, G, and B signals. Specifically, at the start of image sensing by the image-sensing device or at the time of production of the image-sensing device, the image signal obtained from the sensor portion 1 through the A/D conversion circuit 2 is separated by the RGB selection circuit 3 into R, G, and B signals, and the offset voltages to be added individually to these R, G, and B signals are adjusted by the offset adjustment circuits 41, 42, and 43 so as to adjust white balance.

Figure 14:
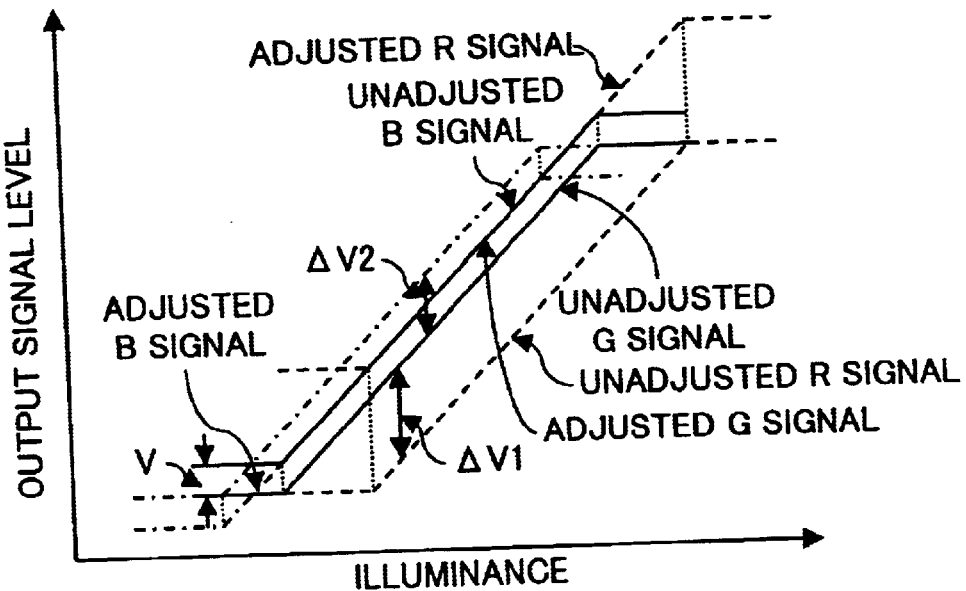
FIG. 14 is a graph showing the relationship between the illuminance and the signal levels of the individual color signals.

For example, suppose that, when the initial state is set at the start of image sensing by the image-sensing device or at the time of production of the image-sensing device, the color temperature of the subject sensed by the sensor portion 1 is 3,200 K and the R, G, and B signals exhibit a relationship as shown in FIG. 14. FIG. 14 is a graph showing the relationship between the illuminance and the signal level for each of the R, G, and B signals, using a semilogarithmic graph with the illuminance plotted on a logarithmic scale. Here, the R, G, and B signals have already been corrected individually for temperature-dependent variations by the output circuit 14 (FIG. 2), and thus have identical gradients as shown in FIG. 14. However, because of variations in the characteristics of the color filters, the levels of the output signals obtained for different colors differ from one another even at identical illuminance.

Here, assume that, at identical illuminance, the difference in signal level between the R and G signals is $\Delta V1$ ($\Delta V1 \geq 0$) and the difference in signal level between the G and B signals is $\Delta V2$ ($\Delta V2 \geq 0$). In this case, the offset adjustment circuits 41, 42, and 43 are made to operate in such a way that the offset voltages added to the R, G, and B signals are, for example, $V+\Delta V1$, V, and $V-\Delta V2$, respectively. This permits the lines representing the relationship between the illuminance and the signal levels of the R, G, and B signals to lie on an identical line as shown in FIG. 14.

In practice, when white balance is adjusted at the start of image sensing by the image-sensing device or at the time of production of the image-sensing device, a white subject that yields maximum levels in all the R, G, and B signals is sensed, and the offset voltages to be added to the R, G, and B signals are adjusted by making the offset adjustment circuits 41, 42, and 43 operate in such a way that the reproduced image appears white. Accordingly, even when proper white balance is achieved by adjusting the offset voltages, the lines representing the relationship between the illuminance and the signal levels of the R, G, and B signals do not always come to lie on an identical line as shown in FIG. 14. Even then, the offset adjustment circuits 41, 42, and 43 keep the offset voltages at the adjusted levels. The R, G, and B signals having the offset voltages added thereto by the offset adjustment circuits 41, 42, and 43 in this way are then fed to the color temperature detection circuit 5 and to the white balance adjustment circuit 6.

The R, G, and B signals fed to the color temperature detection circuit 5 are fed respectively to the integrator circuits 51, 52, and 53 so as to be integrated. Here, integration of these signals is achieved by adding together the signal levels of the color signals of each color for a predetermined time period, for example for the time period in which image signals corresponding to one frame is output, i.e. by adding together the signal levels of the color signals obtained from an identical number of pixels for each color. The R and G signals thus integrated by the integrator circuits 51 and 52 are fed respectively to the input terminals "a" and "b" of the comparator circuit 54, and the G and B signals thus integrated by the integrator circuits 52 and 53 are fed respectively to the input terminals "b" and "a" of the comparator circuit 55. These comparator circuits 54 and 55, using as a reference signal the G signal fed to their respective input terminals "b", detect the signal levels of the R and B signals. Detecting the signal levels of the R and B signals relative to that of the G signal in this way constitutes detecting the color temperature of the subject being sensed.

On the other hand, in the white balance adjustment circuit 6, the R and B signals fed thereto from the initial state setting circuit 4 are fed respectively to the offset adjustment circuits 61 and 62. These offset adjustment circuits 61 and 62 also receive control signals from the comparator circuits 54 and 55, respectively, and, on the basis of these control signals, adjust the offset voltages to be added to the R and B signals.

That is, when a subject is sensed that has a different color temperature from the subject sensed when the initial state is set at the start of image sensing or at the time of production, the signal levels of the R, G, and B signals that have been integrated by the integrator circuits 51, 52, and 53 are changed. As a result of this change, differences appear between the signal levels of the R and G signals and between those of the B and G signals, and the comparator circuits 54 and 55 output control signals that respectively represent those differences. Then, the offset adjustment circuits 61 and 62, on the basis of the control signals fed thereto from the comparator circuits 54 and 55, adjust the offset voltages added to the R and B signals and thereby adjust white balance according to a change in the color temperature of the subject being sensed.

Figure 15:
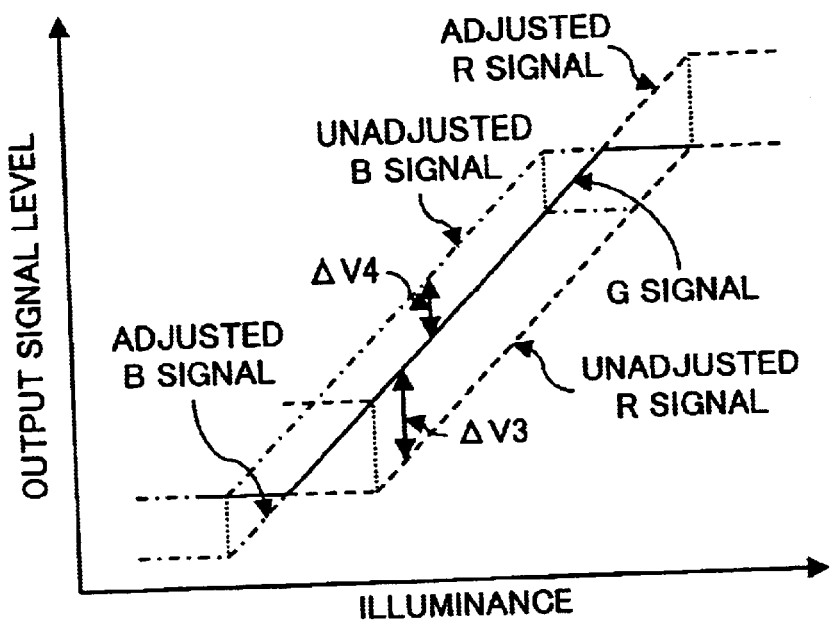
FIG. 15 is a graph showing the relationship between the illuminance and the signal levels of the individual color signals.
Figure 16:
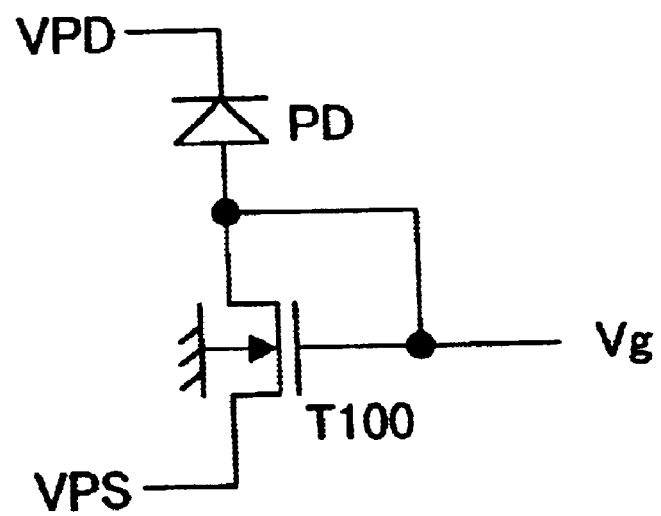
FIG. 16 is a circuit diagram showing the configuration of the photoelectric conversion portion of a pixel.

For example, suppose that, when the color temperature of the subject sensed by the sensor portion 1 is 3,600 K, the R, G, and B signals exhibit a relationship as shown in FIG. 15. FIG. 15 is a graph showing the relationship between the illuminance and the signal level for each of the R, G, and B signals, using a semilogarithmic graph with the illuminance plotted on a logarithmic scale. Here, the R, G, and B signals have already been corrected individually for temperature-dependent variations by the output circuit 14 (FIG. 2), and thus have identical gradients as shown in FIG. 14. However, because of the relationship between color temperature and wavelength, as color temperature varies, the signal levels of different color signals vary even at identical illuminance.

Here, assume that, at identical illuminance, the difference in signal level between the R and G signals is $\Delta V3$ and the difference in signal level between the G and B signals is $\Delta V4$. In this case, the offset adjustment circuits 61 and 62 are made to operate in such a way that the offset voltages added to the R and B signals are, for example, $\Delta V3$ and $-\Delta V4$, respectively. This permits the lines representing the relationship between the illuminance and the signal levels of the R, G, and B signals to lie on an identical line as shown in FIG. 15; that is, the initial state is restored. In this way, white balance is adjusted by adding offset voltages to the individual color signals of which the signal levels vary with color temperature.

Even in cases where the lines representing the relationship between the illuminance and the signal levels of the individual signals do not lie on an identical line in the initial state as described previously, the operation described above of the white balance adjustment circuit 6 restores the initial state, i.e. the state in which proper white balance is achieved.

In this embodiment, the sensor portion is configured as shown in FIG. 2; however, it does not necessarily have to include circuits for sampling and holding image and noise signals. Such circuits for sampling and holding image and noise signals, when provided, may be configured in any other manner than is specifically shown in FIG. 2. In this embodiment, the vertical and horizontal scanning circuits are so configured as to feed signals row by row or column by column; however, they may be so configured as to feed signals randomly. In this embodiment, each pixel is configured as shown in FIG. 8 or 10; however, it may be configured in any other manner than is specifically shown in FIG. 8 or 10 as long as it can produce an electric signal logarithmically proportional to the amount of incident light.

In this embodiment, the R, G, and B signals corresponding to one field are integrated at a time by integrator circuits. However, it is also possible to integrate the signal levels of the individual color signals that correspond to more than one field at a time as long as it is possible to integrate the signal levels of the individual color signals obtained from an identical number of pixels for each color. This permits feedback to take place once for more than one field. Alternatively, it is also possible to integrate the signal levels of the individual color signals obtained not from all the pixels corresponding to one field but from predetermined ones among them. In cases where the sensor portion is so configured that its pixels are arranged in groups each consisting of one pixel with a red color filter, one pixel with a blue color filter, and two pixels with a green filter, it is possible, by doubling the values obtained by integrating the signal levels of the R and B signals, to make equivalent the numbers of pixels for which the signal levels of the individual color signals are integrated. In this embodiment, the G signal is used as a reference color signal; however, it is also possible to use as a reference color signal any other color signal, i.e. the R or B signal.

As described above, a solid-state image-sensing device according to the present invention is provided with an output circuit that outputs a temperature-corrected signal. This prevents variations in the output of the image-sensing device with variations in temperature as experienced conventionally, and thus makes it possible to constantly obtain a stable output that is not influenced by temperature. Moreover, the output circuit corrects not only temperature-dependent variations but also variations in sensitivity among individual pixels, and therefore the output obtained therefrom permits reproduction of high-definition images.

In an image-sensing device according to the present invention, the signal levels of individual color signals are compared with one another to detect the color temperature of the subject being sensed, and, on the basis of the color temperature thus detected, the offset voltages added to the individual color signals are adjusted so as to adjust white balance. In this way, white balance can be adjusted on the basis of the results of comparison of the signal levels of the individual color signals, and therefore, even after the initial state has been set, it is possible to adjust white balance easily and properly. This permits the individual color signals to maintain the correlation with one another as initially set, and thus helps obtain high-definition images with accurate colors at all times.

What is claimed is:

1. An image-sensing device comprising:
    an image sensor including:
        a photoelectric conversion portion that outputs an analog electric signal natural-logarithmically proportional to an amount of incident light, and
        an output circuit that includes a temperature sensor and that corrects the analog electric signal output from the photoelectric conversion portion on a basis of ambient temperature detected by the temperature sensor, wherein the temperature sensor is positioned in the image sensor,
    wherein the output circuit generates a factor that varies with the ambient temperature inside the image-sensing device as detected by the temperature sensor, and multiplies an output from the photoelectric conversion portion by the factor,
    wherein the factor becomes lower as the ambient temperature inside the image-sensing device becomes higher,
    wherein the output circuit comprises:
        a differential amplifier circuit that receives at a non-inverting input terminal thereof a direct-current voltage; and
        a voltage division circuit composed of two resistors connected in series, of which one resistor has one end connected to an output terminal of the differential amplifier circuit, and of which the other resistor receives at one end the electric signal output from the photoelectric conversion portion, a node between the two resistors being connected to an inverting input terminal of the differential amplifier circuit,
    wherein one of the two resistors constituting the voltage division circuit is a temperature-sensitive resistor that serves as the temperature sensor.

2. An image-sensing device comprising:
    an image sensor including:
        a photoelectric conversion portion that outputs an analog electric signal natural-logarithmically proportional to an amount of incident light, and
        an output circuit that includes a temperature sensor and that corrects the analog electric signal output from the photoelectric conversion portion on a basis of ambient temperature detected by the temperature sensor, wherein the temperature sensor is positioned in the image sensor,
    wherein the output circuit generates a factor that varies with the ambient temperature inside the image-sensing device as detected by the temperature sensor, and multiplies an output from the photoelectric conversion portion by the factor,
    wherein the factor becomes lower as the ambient temperature inside the image-sensing device becomes higher,
    wherein the output circuit comprises:
        a differential amplifier circuit;
        a first voltage division circuit composed of two resistors connected in series, of which one resistor receives at one end a direct-current voltage, and of which the other resistor receives at one end the electric signal output from the photoelectric conversion portion, a node between these two resistors being connected to a non-inverting input terminal of the differential amplifier circuit; and
        a second voltage division circuit composed of two resistors connected in series, of which one resistor has one end connected to an output terminal of the differential amplifier circuit, and of which the other resistor receives at one end a direct-current voltage, a node between these two resistors being connected to an inverting input terminal of the differential amplifier circuit;
    wherein one of the two resistors constituting the first voltage division circuit is a temperature-sensitive resistor that serves as the temperature sensor, and one of the two resistors constituting the second voltage division circuit is a temperature-sensitive resistor that serves as the temperature sensor.

3. An image-sensing device comprising:
    an image sensor including:
        a photoelectric conversion portion that outputs an analog electric signal natural-logarithmically proportional to an amount of incident light, and
        an output circuit that includes a temperature sensor and that corrects the analog electric signal output from the photoelectric conversion portion on a basis of ambient temperature detected by the temperature sensor, wherein the temperature sensor is positioned in the image sensor,
    wherein the output circuit generates a factor that varies with the ambient temperature inside the image-sensing device as detected by the temperature sensor, and multiplies an output from the photoelectric conversion portion by the factor, wherein the factor becomes lower as the ambient temperature inside the image-sensing device becomes higher, wherein the output circuit comprises:
- a differential amplifier circuit that receives at a non-inverting input terminal thereof the electric signal output from the photoelectric conversion portion; and
- a voltage division circuit composed of two resistors connected in series, of which one resistor has one end connected to an output terminal of the differential amplifier circuit, and of which the other resistor receives at one end a direct-current voltage, a node between the two resistors being connected to the inverting input terminal of the differential amplifier circuit, wherein one of the two resistors constituting the voltage division circuit is a temperature-sensitive resistor that serves as the temperature sensor.

4. An image-sensing device comprising:
- a plurality of pixels that output a plurality of color signals proportional to amounts of light received in different color ranges;
- an initial state setting portion that corrects the plurality of color signals output from each pixel in such a way that the color signals have a specific correlation with one another at a given color temperature;
- a color temperature detection portion that detects a color temperature of a subject to be sensed; and
- a white balance adjustment portion that further corrects the plurality of color signals already corrected by the initial state setting portion in such a way that the color signals have the specific correlation with one another at the color temperature detected by the color temperature detection portion.

5. An image-sensing device as claimed in claim 4,
wherein the initial state setting portion adds, to the color signals, first offset values that are set separately for the individual color signals beforehand.

6. An image-sensing device as claimed in claim 5,
wherein the white balance adjustment portion adds, to the color signals already corrected by the initial state setting portion, second offset values that are set separately for the individual color signals on a basis of the color temperature detected by the color temperature detection portion.

7. An image-sensing device as claimed in claim 4,
wherein the specific correlation requires that all the color signals have equal signal levels at identical illuminance.

8. An image-sensing device as claimed in claim 4,
wherein the color temperature detection portion uses as a reference signal one of the plurality of color signals and detects a difference in signal level of each of the remaining color signals from the reference signal.

9. An image-sensing device as claimed in claim 4,
wherein the color temperature detection portion detects a color temperature by integrating the color signals output from the plurality of pixels.

10. An image-sensing device as claimed in claim 4,
wherein the pixels each comprise:
- a photosensor that outputs an electric signal proportional to an amount of incident light; and
- a transistor that is connected in series with the photosensor and that operates in a subthreshold region so as to convert the electric signal output from the photosensor into a signal logarithmically proportional to the amount of incident light.

* * * * *

UNITED STATES PATENT AND TRADEMARK OFFICE
CERTIFICATE OF CORRECTION

PATENT NO. : 6,770,861 B2
DATED : August 3, 2004
INVENTOR(S) : Yoshio Hagihara

It is certified that error appears in the above-identified patent and that said Letters Patent is hereby corrected as shown below:

Column 18,
Line 37, after the end of claim 10, insert the following:

--11. An image-sensing device comprising:
a plurality of pixels for outputting a plurality of color signals natural-logarithmically proportional to amounts of light received in different color ranges, said plurality of color signals including a red signal, green signal and blue signal;
an initial state setting portion for correcting the plurality of color signals output from each pixel according to a specific correlation among the color signals at an intensity of illumination;
a detecting portion for respectively detecting each signal level of first and second color signals of the plurality of color signals relative to a signal level of a third color signal selected from the plurality of color signals as a reference signal; and a white balance adjustment portion for further correcting the plurality of color signals already corrected by the initial state setting portion according to the specific correlation among the color signals on the basis of the detection of the signal levels.--.

After the end of newly added claim 11, insert the following:
-- 12. An image-sensing device according to claim 11, wherein the first color signal is the red signal, the second color signal is the blue signal and the third color signal is the green signal. --.

After the end of newly added claim 12, insert the following:

--13. An image-sensing device comprising:
a plurality of pixels for outputting a plurality of color signals natural-logarithmically proportional to amounts of light received in different color ranges;
an initial state setting portion for correcting the plurality of color signals output from each pixel according to a specific correlation among the color signals at an intensity of illumination;
a detecting portion for detecting a signal level of at least one color signal of the plurality of color signals relative to a signal level of another color signal selected from the plurality of color signals as a reference signal; and
a white balance adjustment portion for further correcting the plurality of color signals already corrected by the initial state setting portion according to the specific correlation among the color signals on the basis of the detection of the signal level.--.

UNITED STATES PATENT AND TRADEMARK OFFICE
CERTIFICATE OF CORRECTION

PATENT NO. : 6,770,861 B2
DATED : August 3, 2004
INVENTOR(S) : Yoshio Hagihara

It is certified that error appears in the above-identified patent and that said Letters Patent is hereby corrected as shown below:

Column 18 (cont'd),
After the end of newly added claim 13, insert the following:

--14. An image-sensing device comprising:
a plurality of pixels for outputting a plurality of color signals natural-logarithmically proportional to amounts of light received in different color ranges;
an initial state setting portion for correcting the plurality of color signals output from each pixel according to a specific correlation among the color signals at an intensity of illumination;
a signal level detecting portion that comprises a plurality of integrator circuits and comparator circuits, wherein the integrator circuits are for integrating the color signals output from each pixel and the comparator circuits are for detecting a signal level of at least one color signal of the integrated color signals relative to a signal level of another color signal selected from the integrated color signals as a reference signal; and
a white balance adjustment portion for further correcting the plurality of color signals already corrected by the initial state setting portion according to the specific correlation among the color signals on the basis of the detection of the signal level.-- .

Signed and Sealed this

Eighteenth Day of January, 2005

JON W. DUDAS
*Director of the United States Patent and Trademark Office*